United States Patent
Chen

(10) Patent No.: US 6,670,737 B2
(45) Date of Patent: Dec. 30, 2003

(54) MOTOR HAVING REMOVABLE POLES WITH POSITIONING STRUCTURES

(75) Inventor: Chien-Jung Chen, Kaohsiung (TW)

(73) Assignee: Yen Sun Technology Corp., Taiwan (TW)

(*) Notice: Subject to any disclaimer, the term of this patent is extended or adjusted under 35 U.S.C. 154(b) by 50 days.

(21) Appl. No.: 10/032,541

(22) Filed: Jan. 2, 2002

(65) Prior Publication Data

US 2003/0122443 A1 Jul. 3, 2003

(51) Int. Cl.⁷ .............................. H02K 1/00; F04D 29/00
(52) U.S. Cl. ........................ 310/254; 310/218; 310/194; 417/423.1
(58) Field of Search .................................. 310/216–218, 310/179, 180, 254, 67 R, 194; 417/423.1, 423.12, 423.14, 423.7

(56) References Cited

U.S. PATENT DOCUMENTS 5,410,201 A * 4/1995 Tanaka et al. ............ 310/68 B
6,137,199 A * 10/2000 Lindsley ....................... 310/74
6,329,736 B1 * 12/2001 Bernauer et al. ........... 310/254
6,411,006 B2 * 6/2002 Suzuki et al. ............... 310/254

FOREIGN PATENT DOCUMENTS

TW            382412           2/2000

* cited by examiner

Primary Examiner—Tran Nguyen
(74) Attorney, Agent, or Firm—Larson & Taylor, PLC

(57) ABSTRACT

A positioning structure for motor's pole includes a housing provided with a pivot portion having a periphery provided with multiple wall plates and a pair of insertion seats. Each of the insertion seats is formed with an insertion groove for insertion of a circuit board. The housing is provided with multiple combination posts. The pole includes a magnetically conducting material, and an insulating material. The magnetically conducting material is enclosed by the insulating material, and is partially exposed outward from the insulating material. The magnetically conducting material is wound with a conducting wire.

8 Claims, 5 Drawing Sheets

MOTOR HAVING REMOVABLE POLES WITH POSITIONING STRUCTURES

BACKGROUND OF THE INVENTION

1. Field of the Invention

The present invention relates to a positioning structure for motor's pole, and more particularly to a pole of an outer pole type heatsink fan, wherein the positioning structure may be assembled easily, and may prevent misplacement of the pole.

2. Description of the Related Art

A conventional heatsink fan structure in accordance with the prior art shown in FIG. 7 is disclosed in the applicant's Taiwanese Patent Publication No. 382412, comprising a base board 90 having a shaft 91 for supporting an impeller 92 to rotate. The outer periphery of the blades 93 of the impeller 92 is combined with a magnet ring 94. The base board 90 is provided with multiple poles 95 for fixing winding coils 97, and an outer frame 96 is mounted on the base board 90. The magnet ring 94 may induce with the coils 97 of the base board 90, so that the impeller 92 may be rotated, and the blades 93 may drive the air to flow.

In the conventional impeller structure, each of the coils 97 is wound respectively to form a unit. After the unit of the coil 97 is fixed on the pole 95 respectively, the terminal of the coil 97 may be connected outward. However, the connection work of the terminal of the coil 97 is more inconvenient, and easily causes misconnection of polarity.

SUMMARY OF THE INVENTION

The primary objective of the present invention is to provide a positioning structure for motor's pole, wherein the pole may be wound with a conducting wire rapidly and conveniently.

A secondary objective of the present invention is to provide a positioning structure for motor's pole, wherein when the pole is mounted on the housing, the positioning structure may be assembled easily, and may prevent misplacement of the pole.

In accordance with the present invention, there is provided a positioning structure for motor's pole including a housing provided with a pivot portion having a periphery provided with multiple wall plates and a pair of insertion seats. Each of the insertion seats is formed with an insertion groove for insertion of a circuit board. The housing is provided with multiple combination posts. The pole includes a magnetically conducting material, and an insulating material. The magnetically conducting material is enclosed by the insulating material, and is partially exposed outward from the insulating material. The magnetically conducting material is wound with a conducting wire.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
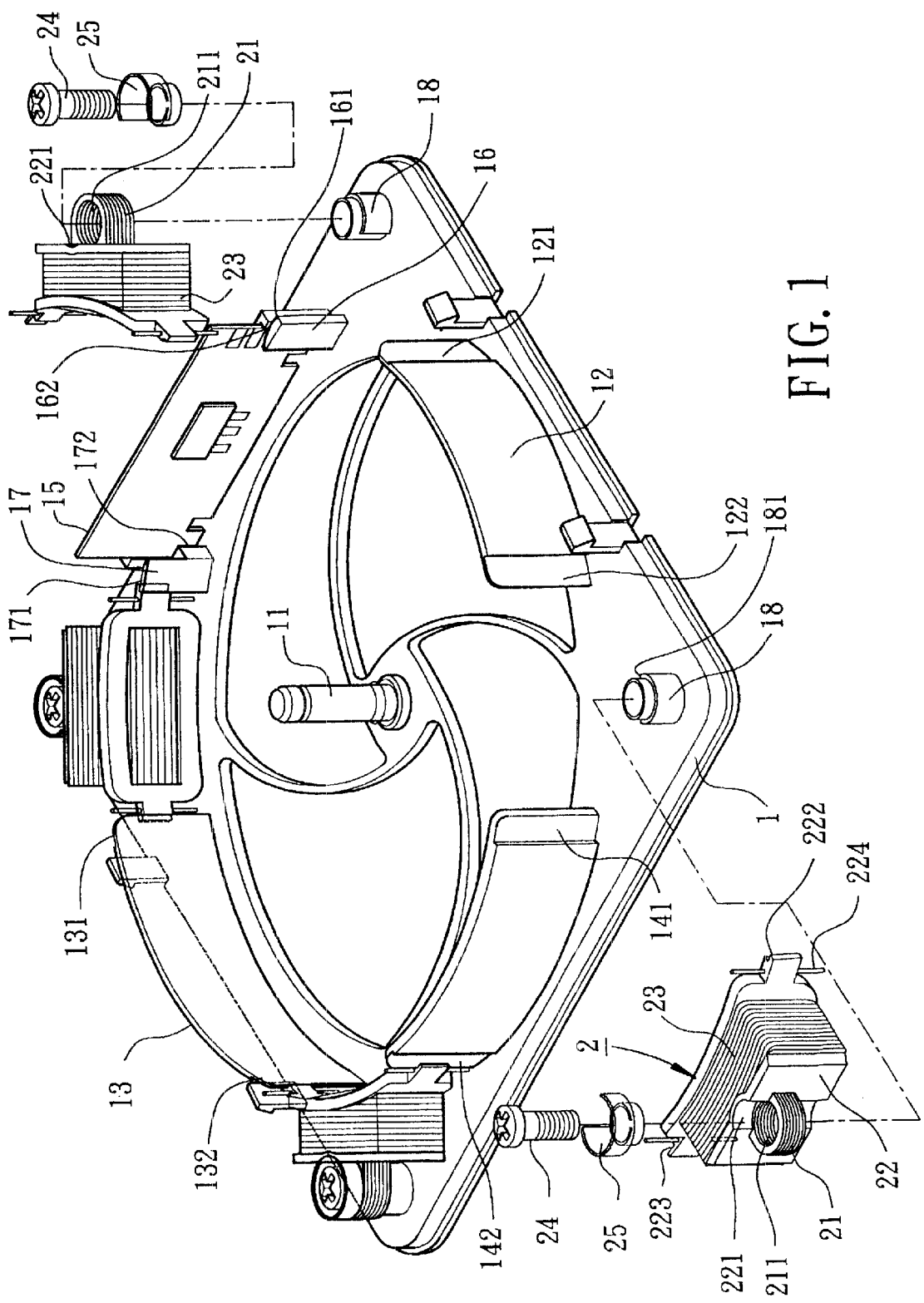
FIG. 1 is an exploded perspective view of a positioning structure for motor's pole in accordance with a preferred embodiment of the present invention.

Referring to the drawings and initially to FIG. 1, a positioning structure for motor's pole in accordance with a preferred embodiment of the present invention comprises a housing 1, and multiple poles 2.

The housing 1 may be the housing of a conventional motor, heatsink fan or the like. The housing 1 has a pivot portion 11 that may be a central shaft or a bearing seat, for pivoting a rotor to rotate. The housing 1 has a periphery provided with multiple wall plates 12, 13 and 14, and a pair of insertion seats 16 and 17 for insertion of a circuit board 15. The multiple wall plates 12, 13 and 14 and the circuit board 15 may enclose a space in which the rotor may be rotated. The wall plate 12 has two ends 121 and 122, the wall plate 13 has two ends 131 and 132, and the wall plate 14 has two ends 141 and 142. The insertion seat 16 has an outer end 161, and is formed with an insertion groove 162 for insertion of the circuit board 15, and the insertion seat 17 has an outer end 171, and is formed with an insertion groove 172 for insertion of the circuit board 15. The wall plates 12 and 13 are opposite to each other, and the wall plate 14 and the circuit board 15 are located between the wall plates 12 and 13. In the preferred embodiment of the present invention, the two ends 121 and 122 of the wall plate 12 are made thinner, and the two ends 131 and 132 of the wall plate 13 are made thinner, while the two ends 141 and 142 of the wall plate 14 are made thicker, and the outer ends 161 and 171 of the two insertion seats 16 and 17 are made thicker. In addition, the housing 1 is provided with multiple combination posts 18 for fixing the poles 2.

Figure 2:
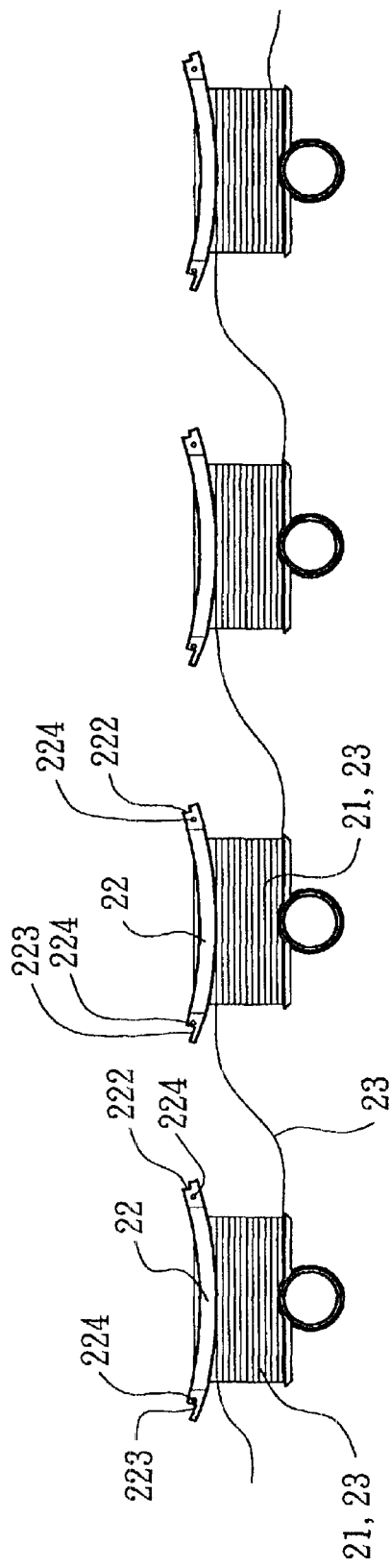
FIG. 2 is a top plan view of the positioning structure for motor's pole, wherein the pole is wound with a conducting wire.
Figure 3:
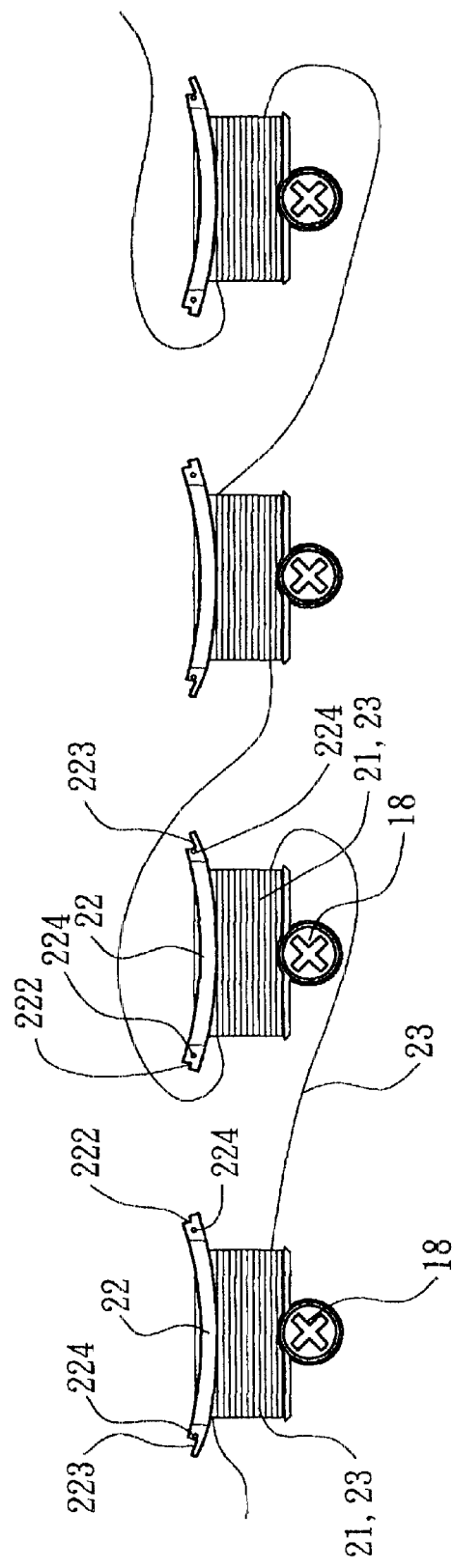
FIG. 3 is a top plan view of the positioning structure for motor's pole, wherein the pole is combined with the combination post.

Referring to FIGS. 1 and 2, the pole 2 includes a magnetically conducting material 21 made of a silicon steel plate, and an insulating material 22. The magnetically conducting material 21 is enclosed by the insulating material 22, and is partially exposed outward from the insulating material 22. A conducting wire 23 may be wound around the magnetically conducting material 21 to required turns. In the preferred embodiment of the present invention, the conducting wire 23 is formed with a single conducting wire. As shown in FIG. 2, the conducting wire 23 may be wound around the magnetically conducting materials 21 of the even numbers of poles 2 in a continuous manner. After the conducting wire 23 is wound to predetermined turns, the magnetically conducting materials 21 may be combined on the combination posts 18 of the housing 1 through the positioning hole 211 in alternate manner as shown in FIG. 3. Thus, any two adjacent poles 2 have different directions of current and magnetic field.

After the pole 2 that is wound by the single conducting wire 23 is energized, each pole 2 may produce different alternating magnetic fields which may form a magnetic force to produce a repulsive action with the permanent magnet of the rotor, thereby driving the rotor to rotate.

The positioning hole 211 of the pole 2 may receive a mounting ring 25 made of insulating material, thereby preventing a magnetic loss from producing between the magnetically conducting material 21 and the positioning member 24.

In addition, the insulating material 22 on the outer periphery of the positioning hole 211 is formed with an arcuate groove 221, and the combination post 18 is formed with an arcuate cutout face 181 which is complimentary with the arcuate groove 221 of the insulating material 22, thereby facilitating the pole 2 combining with the combination post 18, and thereby providing a positioning effect when the pole 2 is combined with the combination post 18.

Further, the insulating material 22 of the pole 2 has two ends 222 and 223 rested on the wall plates 12, 13 and 14, and the outer ends 161 and 171 of the two insertion seats 16 and 17. The two ends 222 and 223 of the insulating material 22 of the pole 2 are made with different thickness, so that the pole 2 may be placed along the correct direction. The end 222 is thicker, and the end 223 is thinner. The thicker end 222 is complimentary with the thinner ends 121, 122, 131 and 132 of the wall plates 12 and 13. The thinner end 223 is complimentary with the thicker ends 141 and 142 of the wall plate 14, and the thicker outer ends 161 and 171 of the two insertion seats 16 and 17.

Thus, when the poles 2 are not arranged in alternate manner as shown in FIG. 3, the thicker end 222 of the pole 2 will overlap the thicker ends 141 and 142 of the wall plate 14, and the thicker outer ends 161 and 171 of the two insertion seats 16 and 17, so that the poles 2 cannot be placed into the space. Thus, the structure may be used to prevent misplacement of the poles 2.

In addition, each of the two ends 222 and 223 of the insulating material 22 of the pole 2 is provided with a guide post 224 for guiding the conducting wire, so that the guide post 224 may be used to conduct the electrical power.

Figure 4:
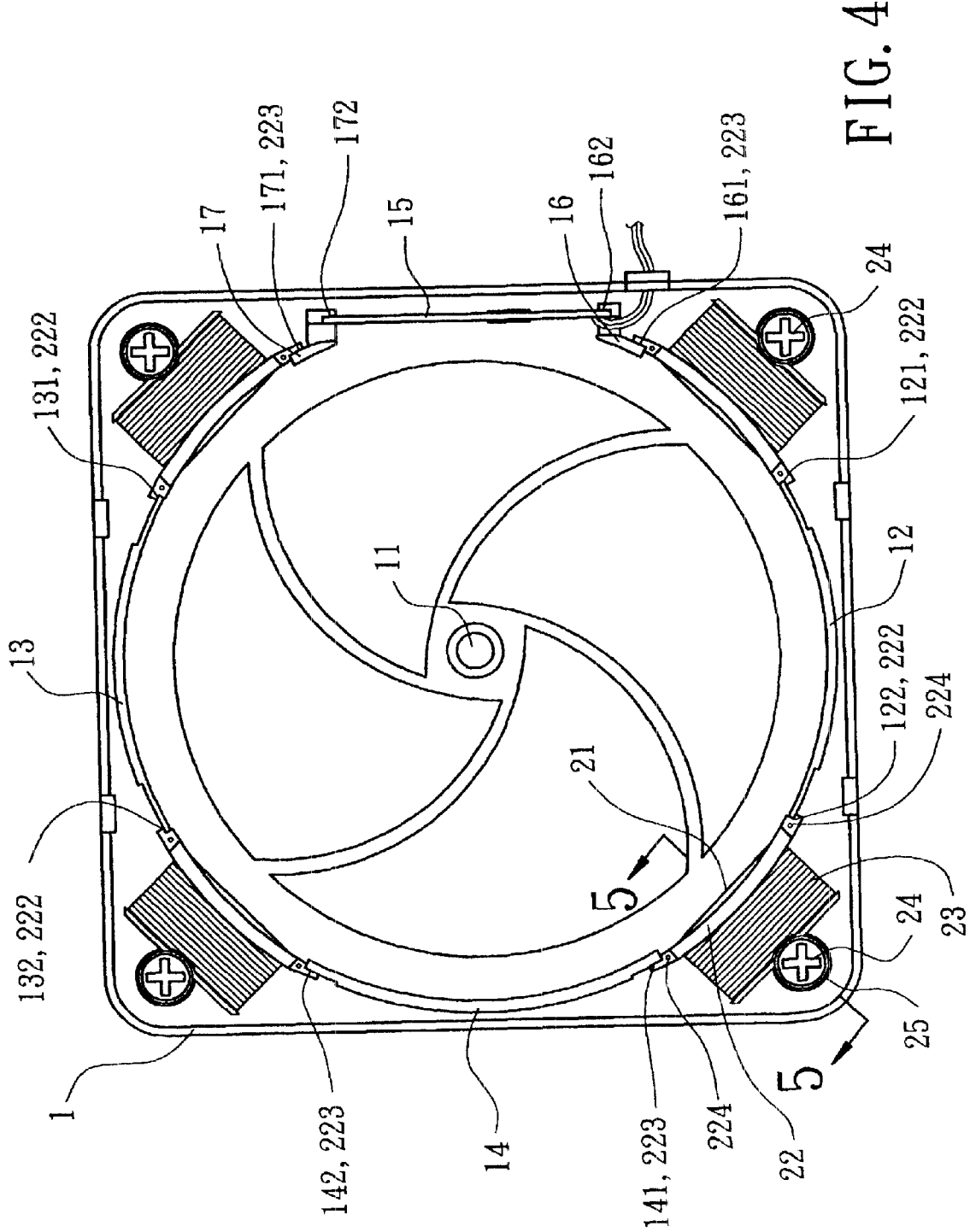
FIG. 4 is a top plan assembly view of the positioning structure for motor's pole as shown in FIG. 1.
Figure 5:
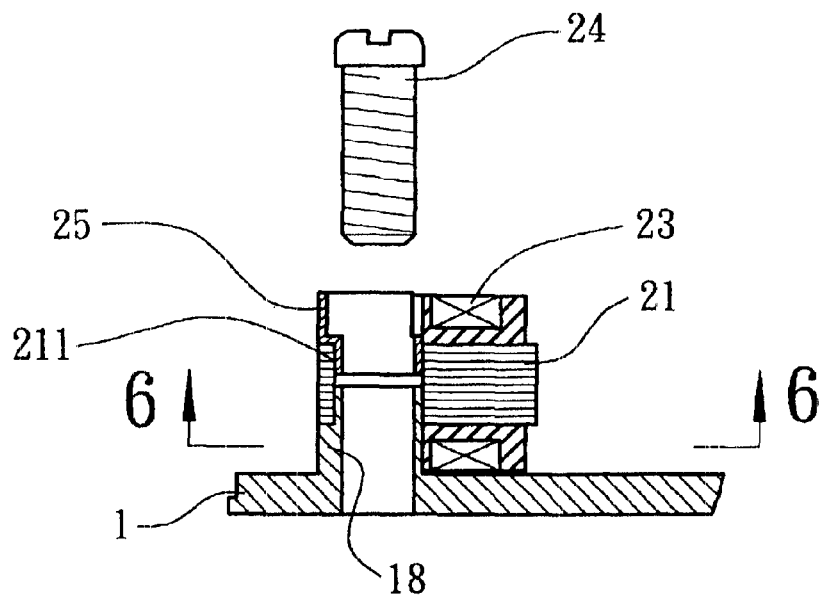
FIG. 5 is a cross-sectional view of the positioning structure for motor's pole taken along line 5—5 as shown in FIG. 4.

Referring to FIGS. 4 and 5, the pole 2 is combined with the combination post 18 of the housing 1. The pole 2 may be combined on the combination post 18 of the housing 1 through the positioning hole 211 of the magnetically conducting materials 21, and the positioning hole 211 of the pole 2 may receive a mounting ring 25. By rotation of the positioning member 24, the mounting ring 25 may clamp and secure the pole 2. The positioning member 24 may be a conventional bolt, and has a head that may be protruded outward from or sunk into the mounting ring 25.

Figure 6:
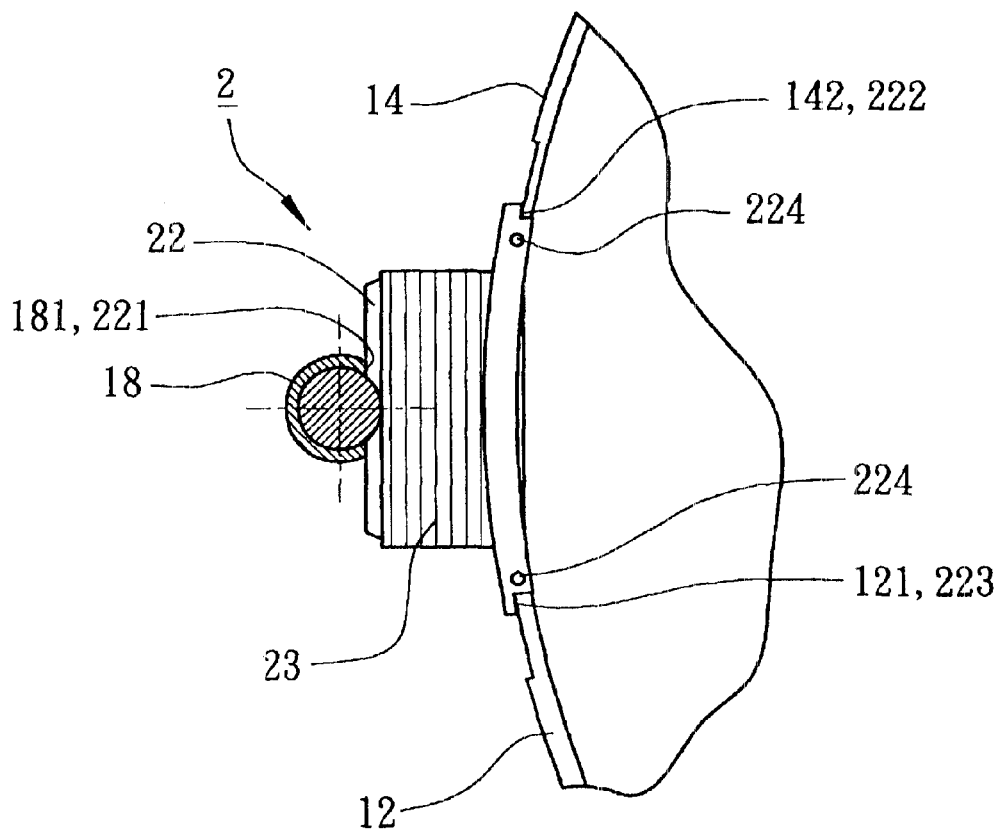
FIG. 6 is a cross-sectional view of the positioning structure for motor's pole taken along line 6—6 as shown in FIG. 5.
Figure 7:
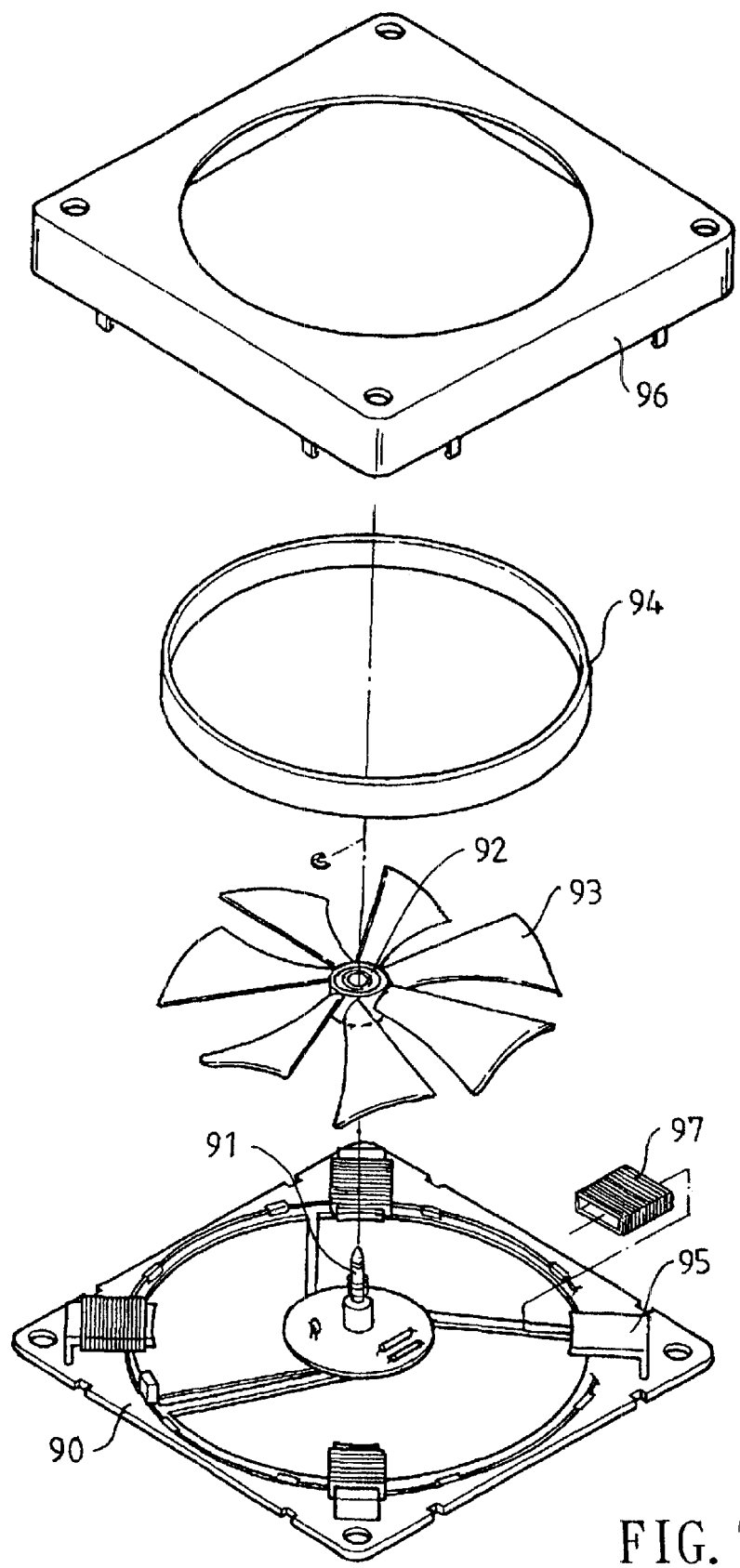
FIG. 7 is an exploded perspective cross-sectional assembly view of a conventional heatsink fan structure in accordance with the prior art.

Referring to FIG. 6, when the pole 2 is combined with the combination post 18 of the housing 1 through the positioning hole 211 of the magnetically conducting materials 21, the arcuate groove 221 of the insulating material 22 of the pole 2 is complimentary with the arcuate cutout face 181 of the combination post 18. In addition, the two ends 222 and 223 of the insulating material 22 of the pole 2, and the wall plates 12, 13 and 14 and the two outer ends 161 and 171 of the two insertion seats 16 and 17 of the housing 1 are formed with different thick and thin designs previously. Thus, after the pole 2 is wound with a single conducting wire 23, if the poles 2 are not arranged in alternate manner as shown in FIG. 3, the poles 2 cannot be placed into the space conveniently, thereby preventing misplacement of the poles 2.

Accordingly, in the positioning structure for motor's pole of the present invention, the pole may be wound by a single conducting wire, so that the work of winding the conducting wire is more convenient, and the pole may be secured on the combination post of the housing conveniently. Especially, when the pole is placed on the combination post of the housing, the arcuate groove of the insulating material of the pole is complimentary with the arcuate cutout face of the combination post. In addition, the two ends of the insulating material of the pole, and the wall plates and the two outer ends of the two insertion seats of the housing are formed with different thick and thin designs previously. Thus, if the poles are not arranged in alternate manner, the poles cannot be placed into the space conveniently, thereby preventing misplacement of the poles.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A motor having removable poles with positioning structures, comprising:

a housing, having a pivot portion, and a circumferential periphery provided with multiple wall plates and a pair of insertion seats, each of the two insertion seats having an outer end, and formed with an insertion groove for insertion of a circuit board, the housing provided with multiple combination posts; and at least one pole, including a magnetically conducting material part, and an insulating material part, the magnetically conducting material part enclosed by the insulating material part, and partially exposed outward from the insulating material part, the magnetically conducting material part having a positioning hole combined on the combination post of the housing, the magnetically conducting material part wound with a conducting wire.

2. The motor as claimed in claim 1, wherein said housing having three wall plates, a first and a second wall plates of said three wall plates respectively are configured with the two ends thereof having the same thickness, the outer ends of the two insertion seats have the same thickness, and the ends of a third wall plate of said three wall plates and the outer ends of the adjacent insertion seat having different thicknesses with respect to the first and second wall plates.

3. The motor as claimed in claim 1, wherein the pole has two ends, one end is thicker and the other end is thinner, the pole is combined on the combination post of the housing in alternate manner, and the two ends of the pole and the two ends of the wall plate and the outer end of the insertion seat are complimentary with each other.

4. The motor as claimed in claim 1, wherein the insulating material part of the pole is formed with an arcuate groove, and the combination post of the housing is formed with an arcuate cutout face which is complimentary with the arcuate groove of the insulating material part of the pole.

5. The motor as claimed in claim 1, wherein the insulating material part of the pole is provided with a guide post for guiding the conducting wire, and the guide post is conducted with the magnetically conducting material part.

6. The motor as claimed in claim 1, whrein the hole of the pole receives a mounting ring made of insulating material part.

7. A motor having removable poles with positioning structures, each of the poles comprising:

a magnetically conducting material part, and an insulating material part, the magnetically conducting material part enclosed by the insulating material part, and partially exposed outward from the insulating material part, a single conducting wire continuously wound around the magnetically conducting material part; said insulating material part having two distal ends provided with two different thicknesses for ensuring a correct assembled relationship with two adjacent wall plates.

8. The motor as claimed in claim 7, whrein the poles are equi-spaced and arranged to have magnetic alternate polarities.

* * * * *